(12) United States Patent
Carpenter, Jr.

(10) Patent No.: US 11,365,538 B2
(45) Date of Patent: Jun. 21, 2022

(54) CESSPOOL AND LINER

(71) Applicant: UNETLANVHI HOLDINGS LLC, Auburn, CA (US)

(72) Inventor: William Carpenter, Jr., Auburn, CA (US)

(73) Assignee: UNETLANVHI HOLDINGS LLC, Auburn, CA (US)

( * ) Notice: Subject to any disclaimer, the term of this patent is extended or adjusted under 35 U.S.C. 154(b) by 0 days.

(21) Appl. No.: 16/804,584

(22) Filed: Feb. 28, 2020

(65) Prior Publication Data

US 2020/0277777 A1 Sep. 3, 2020

Related U.S. Application Data

(60) Provisional application No. 62/812,694, filed on Mar. 1, 2019.

(51) Int. Cl.
| | |
|---|---|
| *E03F 11/00* | (2006.01) |
| *E03F 5/02* | (2006.01) |
| *C02F 3/12* | (2006.01) |
| *C02F 1/00* | (2006.01) |
| *E03F 7/00* | (2006.01) |

(52) U.S. Cl.
CPC ............ *E03F 5/025* (2013.01); *C02F 1/00* (2013.01); *E03F 7/00* (2013.01); *E03F 11/00* (2013.01); *C02F 2303/14* (2013.01)

(58) Field of Classification Search
CPC ... E03F 11/00; E03F 5/025; E03F 5/14; E03F 7/00; E03F 1/002; C02F 1/00; C02F 2001/007; C02F 2303/14; C02F 3/1242; C02F 3/06; Y02A 20/108; Y02A 20/208; Y02W 10/10
See application file for complete search history.

(56) References Cited

U.S. PATENT DOCUMENTS

| | | | | |
|---|---|---|---|---|
| 5,162,083 A | * | 11/1992 | Forbes | C02F 3/1242 210/199 |
| 5,221,470 A | * | 6/1993 | McKinney | C02F 3/1242 210/151 |
| 5,549,818 A | * | 8/1996 | McGrew, Jr. | C02F 3/20 210/195.4 |
| 5,785,854 A | * | 7/1998 | McKinney | C02F 3/20 210/620 |
| 6,080,305 A | * | 6/2000 | Sandahi | B01D 21/26 210/97 |
| 6,217,761 B1 | * | 4/2001 | Catanzaro | C02F 3/1242 210/195.4 |
| 2007/0166171 A1 | | 7/2007 | Kondo | |
| 2016/0031734 A1 | * | 2/2016 | Jordan | C02F 3/2866 210/207 |
| 2017/0015575 A1 | * | 1/2017 | Carpenter, Jr. | C02F 3/1247 |
| 2020/0071217 A1 | * | 3/2020 | Drewery | C02F 9/005 |

FOREIGN PATENT DOCUMENTS

| | | | | |
|---|---|---|---|---|
| DE | 19525588 A1 | * | 1/1997 | ............ B01D 29/01 |
| DE | 19939917 C1 | * | 4/2001 | ........ B01D 21/0003 |
| GB | 2280383 A | * | 2/1995 | ............ E03F 11/00 |
| WO | WO-2014067502 A1 | * | 5/2014 | ............... E03F 5/16 |

\* cited by examiner

*Primary Examiner* — Frederick L Lagman
*Assistant Examiner* — Stacy N Lawson
(74) *Attorney, Agent, or Firm* — One LLP

(57) ABSTRACT

Disclosed herein is a free-standing cesspool and a cesspool liner that may be used to retrofit existing cesspools in order to provide additional storage and/or processing for raw sewage before the sewage leaches out of the cesspool.

12 Claims, 4 Drawing Sheets

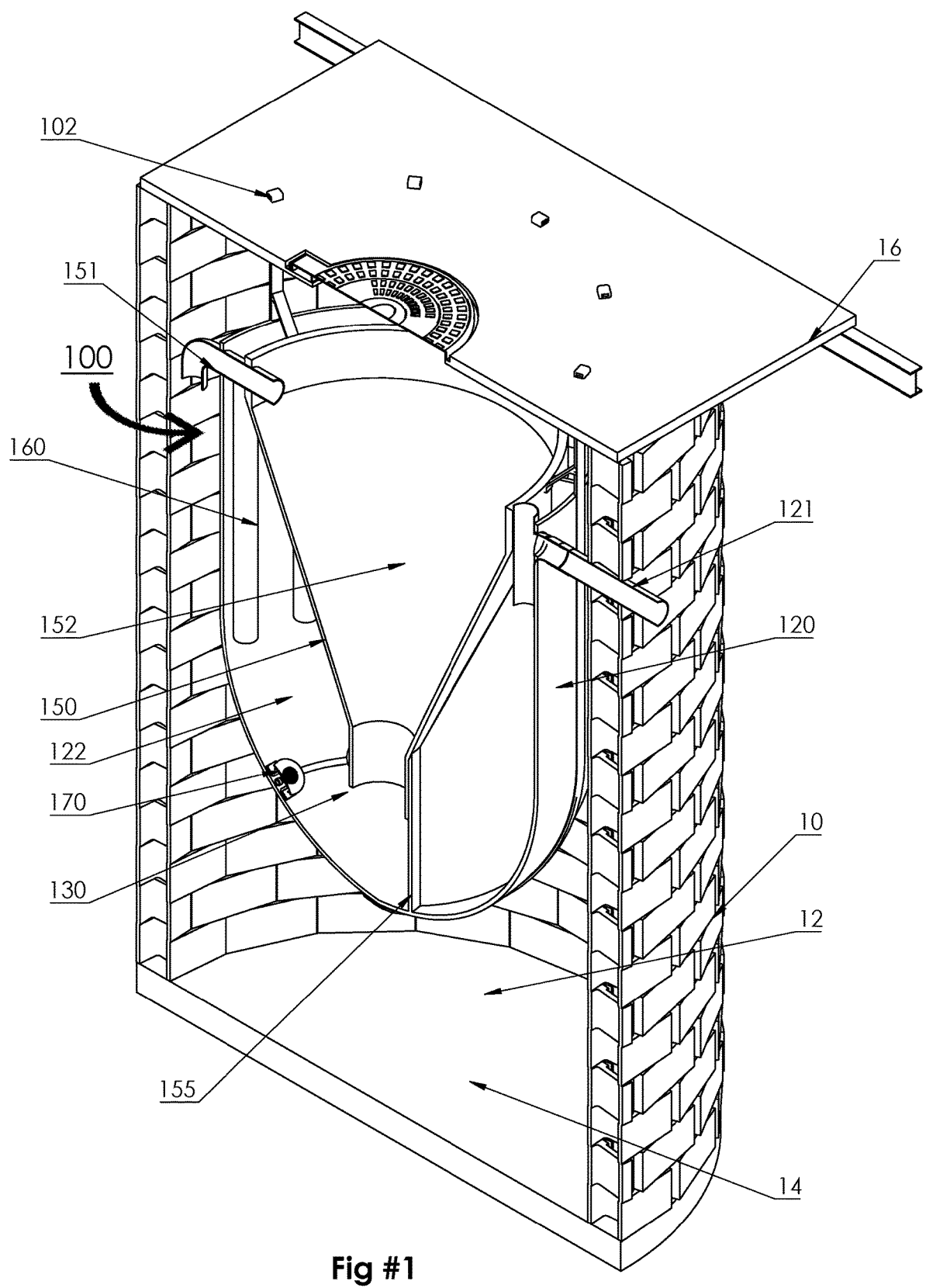
Fig #1

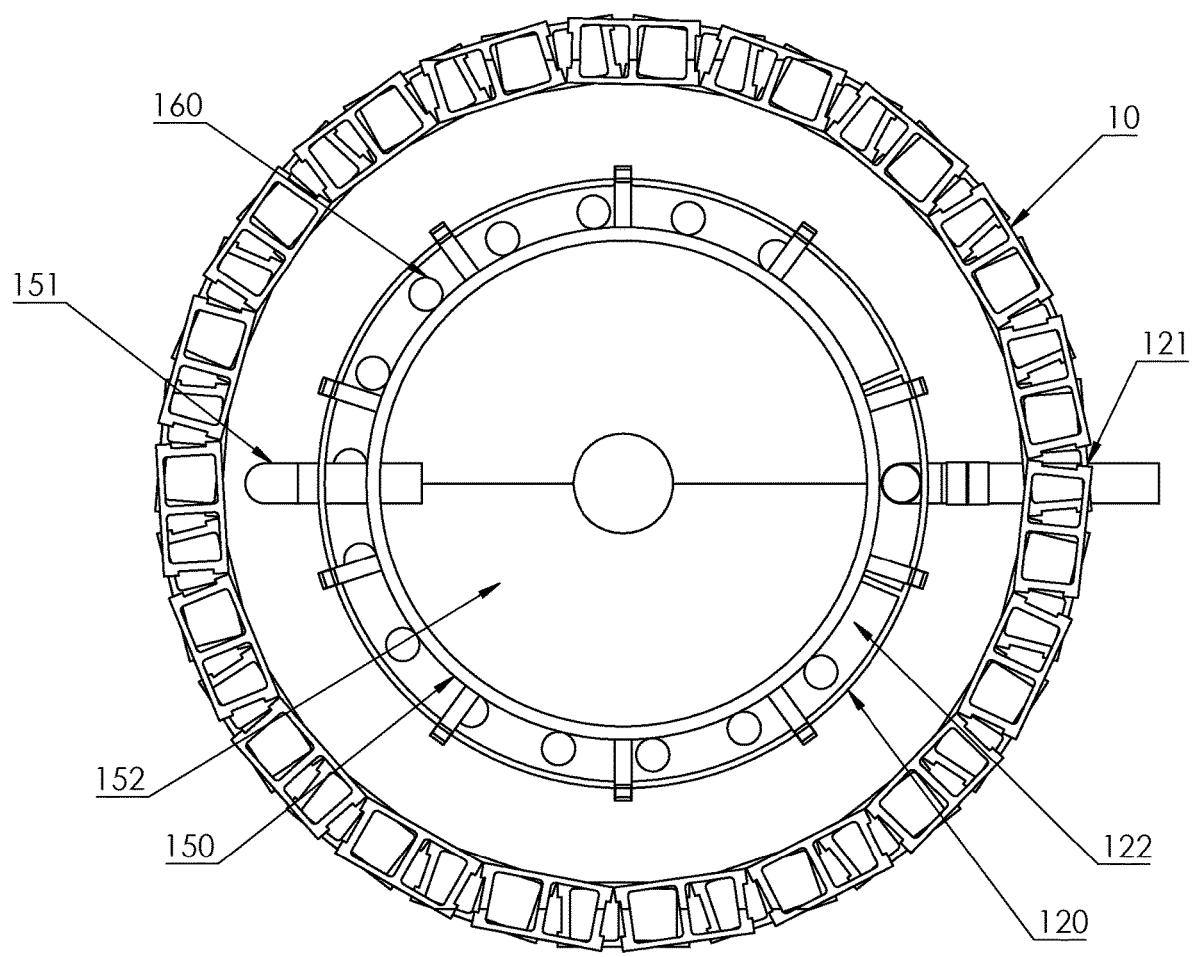
Fig #2

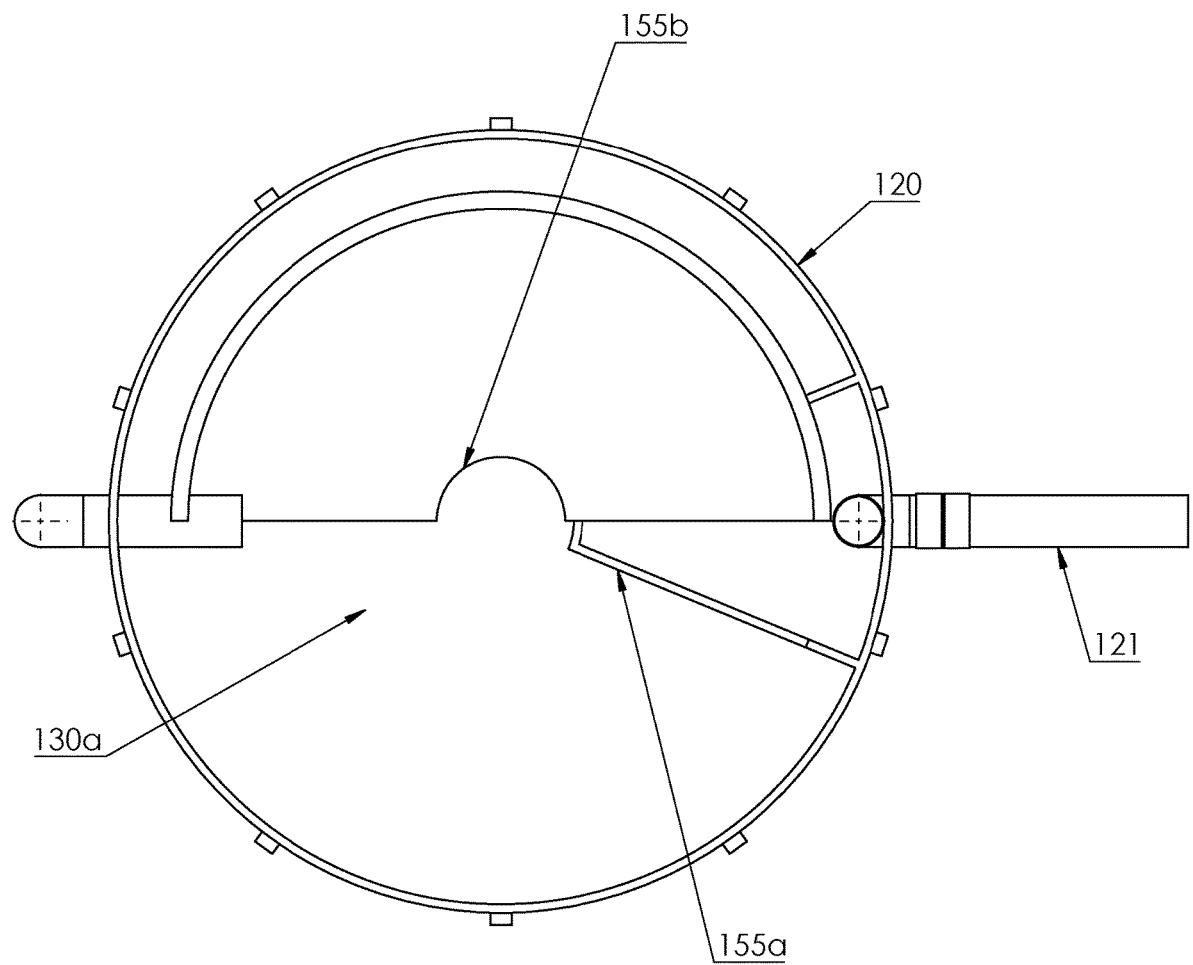
Fig #3

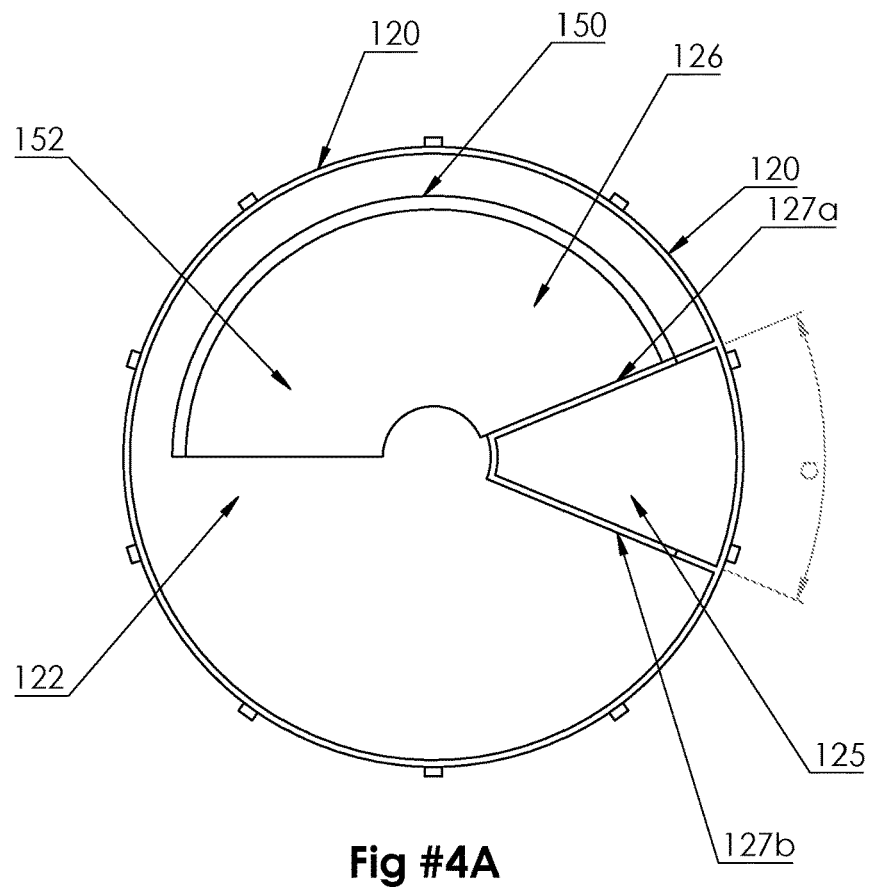
Fig #4A
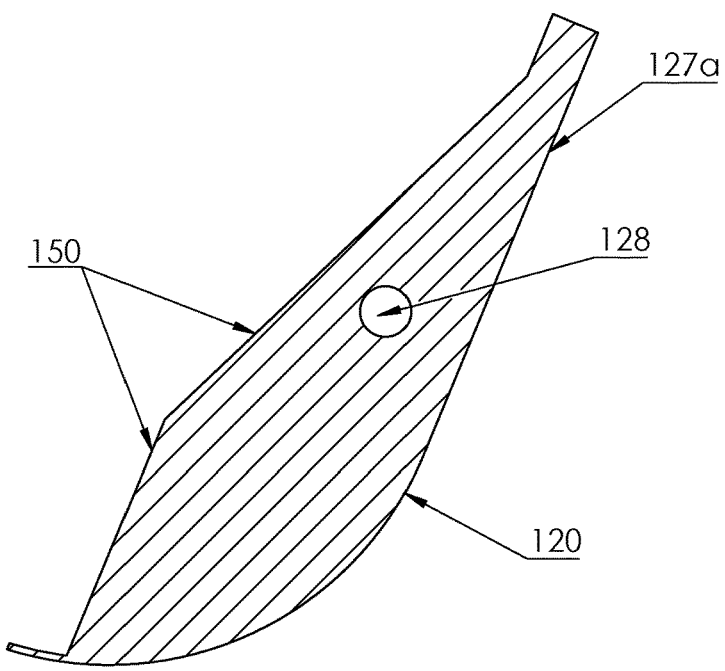
Fig #4B

CESSPOOL AND LINER

CROSS-REFERENCE TO RELATED APPLICATIONS

This application claims priority to and the benefit of U.S. Provisional Patent Application No. 62/812,694 filed Mar. 1, 2019, both of which are incorporated by reference herein in their entireties for all purposes.

FIELD

The invention relates to cesspools and similar installations for the disposal and treatment of biological waste including fecal matter.

BACKGROUND

The following description of the background of the invention is provided simply as an aid in understanding the invention and is not admitted to describe or constitute prior art to the invention.

Cesspools, also known as cesspits, are primitive structures for disposing of sewage. The essence of a cesspool is a pit dug into the ground defining a pit space 12 into which untreated or partially-treated sewage flows (e.g., through an inlet pipe) or is dumped. Optionally, the pit wall 10 is reinforced to prevent cave-ins and otherwise maintain the integrity of the pit and pit wall. For example, pit wall 10 may be lined with bricks, stones, and like, as illustrated in FIG. 1. Alternatively, some cesspools have a manufactured wall (e.g., of metal, plastic, or other suitable material) for durability, ease of installation, and convenience. Commonly, pit wall 10 is porous or fluid-permeable to allow the aqueous cesspool liquids to leach into the surrounding soil around the cesspool. Cesspool floor 14 may be formed from the naturally-occurring soil, compacted soil, or may be engineered and reinforced. Commonly, cesspool floor 14 is compacted gravel or aggregate. Cesspool floor 14 may be fluid-impermeable but more commonly is at least somewhat fluid-permeable in order to allow the aqueous cesspool liquids to leach into the surrounding soil below the cesspool. Optionally, the cesspool has a removable cover 16 in order to prevent people, animals, and debris from falling into the cesspool and to allow servicing and maintenance, including pump-outs. In a residential home setting, the cesspool is often located under the driveway and cover 16 is made from concrete or similar material to support automobile and foot traffic.

One fundamental problem with cesspools is that there is no appreciable treatment of the sewage which eventually contaminates the surrounding soil. Although the installation of cesspools is prohibited in most areas of the United States and many other countries, there remains a significant installed base of cesspools both domestically and worldwide. The problem of contamination, the fact that cesspools have been used historically in low-income and rural communities, and that installation of modern septic tanks and/or sewerage connections is expensive mean that the use of cesspools is likely to persist well into the future. Thus, there is a need to provide a device that is inexpensive, easily installed in existing cesspools, provides at least some level of sewage treatment, and provides an optional connection to a septic tank, sewer line, or other sewage treatment and/or disposal option.

SUMMARY

The present disclosure provides a self-contained cesspool and a cesspool liner that may be used to retrofit existing cesspools and provide some amount of sewage treatment before the sewage is discharged (leaches) into the surrounding soil. The cesspool and cesspool liner may be easily configured to accept sewage from a variety of input formats and may be easily connected to other sewage processing systems such as a septic tank or sewage line.

In one aspect, the invention comprises an apparatus (e.g., a cesspool liner) comprising:

(a) an outer fluid retention bag having a top and a bottom, comprising an outer shell of fluid-impermeable material and having a working volume of at least 250 gallons including, for example, at least 500, 1,000, 1,250, 1,500, 1,750, 2,000, 2,500, 3,000, 3,500, 4,000, 4,500, 5,000 gallons or more;

(b) an inner chamber with an open bottom disposed within the outer fluid retention bag (i) defining a primary settling space between the outer fluid retention bag and the inner chamber, (ii) defining a secondary settling space within the inner chamber, and (iii) defining a fluid flow path from the primary settling space into the secondary settling space through the open bottom;

(c) an inlet defining a flow path adapted to deliver fluid from outside of the outer fluid retention bag into the primary settling space;

(d) an outlet defining a flow path adapted to deliver fluid from within the secondary settling space to the outside of the outer fluid retention bag; and (e) one or more suspension elements attached to the top of the outer fluid retention bag and adapted to suspend the outer fluid retention bag from above.

In some embodiments, the outer fluid retention bag is substantially cylindrical or spherocylindrical. In some embodiments, the outer fluid retention bag is open at the top. In some embodiments, the outer fluid retention bag comprises PVC.

In some embodiments, the inner chamber comprises a frustoconical shape.

In some embodiments, the inlet is attached to a sewage source. In some embodiments, the suspension elements comprise loops.

In some embodiments, the apparatus further comprises a flow barrier extending from a side wall of the inner chamber to a side wall of the outer chamber and establishing a fluid flow path around the primary settling space.

In some embodiments, the apparatus further comprises one or more bacterial substrates within the primary settling space. Optionally, the apparatus further comprises an air pump and one or more diffusors adapted to deliver ambient air into the primary settling space, the secondary settling space, or both.

In another aspect, the invention provides a cesspool/cesspit comprising:

(a) a below-ground pit open at the top;
(b) a pit cover or runners;
(c) an apparatus according to any of the foregoing aspects or embodiments;

wherein the apparatus is suspended in the pit from the pit cover or runners such that the apparatus bottom does not contact the bottom of the pit; wherein a sewage source is connected to the inlet; and wherein the outlet discharges fluid into the pit.

BRIEF DESCRIPTION OF THE DRAWINGS

FIG. 1 is a schematic of a cesspool liner.
FIG. 2 is a cross-section of a cesspool liner towards the top at the level of the inlet and outlet.

FIG. 3 is a schematic cross section of a cesspool liner towards the bottom, at the level of the fluid flow gap.

FIG. 4A is a cross-sectional top view of a two-chambered cesspool liner of the invention. FIG. 4B is a lateral perspective view of the retention chamber side wall.

DETAILED DESCRIPTION OF THE DISCLOSURE

The present disclosure provides a device that may be used as a cesspool or a liner that may be retrofitted to an existing cesspool. FIG. 1 is a schematic illustrating certain features and general relationships of cesspool liner 10. Generally, cesspool liner 100 comprises inlet 121, body 120, inner settling tower 150, and effluent outlet 151. The space between inner settling tower 150 and the inner wall of body 120 defines the primary settling space 122, and the interior space defined by settling tower 150 is the secondary settling space 152. Cesspool liner 100 is adapted to hang in pit space 12 and suspended above pit floor 14. Optionally, cesspool liner 100 is suspended from cover 16. In this configuration, it is preferable that cover 16 also has an access port to allow for pumping and other maintenance without having to remove the entire cover 16 and cesspool liner 100 installation. Alternatively, cesspool liner 100 may be suspended within pit space 12 from a suspension mechanism independent of cover 16 such that cover 16 may be removed and replaced without affecting cesspool liner 100. In some embodiments, cesspool liner 100 can be suspended from a frame that is above the ground or partially in the ground, with sewage gravity fed or pumped into it, and with treated water gravity drained or pumped therefrom.

Generally, cesspool liner 100 is configured such that sewage flows into cesspool liner 100 through inlet 121 and empties into primary settling space 122. Sludge, scum, and liquids separate in primary settling space 122. Liquids flow upward through secondary settling space 152 defined by settling tower 150 and exit outlet 151. Typically, inlet 121 and outlet 151 are positioned toward the top of cesspool liner 100 in order to maximize the working volume.

FIG. 2 illustrates a cross-sectional view of cesspool liner 100 illustrating the relationship of inlet 121 and outlet 151 to primary settling space 122 and secondary settling space 152, respectively. The orientation of inlet 121 and outlet 151 relative to each other is not intended to be limiting. The structure, function, and installation of liner 10 is described in more detail below.

Inlet

Inlet 121 is adapted to form a connection with a sewage source and direct incoming sewage into primary settling space 122. Sewage sources include, for example, residential and commercial sewage effluent, and effluent from portable sewage sources such as cleanout stations, pumpouts and dumpouts for campers, trailers, and portable toilets. Inlet 121 may take any convenient form designed to interface with that sewage source and form a connection. For example, in one embodiment, inlet 121 may be merely an opening in the top or side wall of body 120 through which a pipe or flow channel/path from the sewage source is inserted. This configuration may be useful for adapting cesspool liner 100 to an existing cesspool with an existing sewage supply line from a residential or commercial building. In another embodiment, inlet 121 may comprise a pipe or flow channel such as a rigid pipe (e.g., metal and PVC) or collapsible tube, optionally with fittings (e.g., a flange) to facilitate a fluid-tight connection with the sewage source outflow. In another embodiment, inlet 121 may be a funnel or other fluid intake port in cover 16. Such a configuration may be used, for example, at a camper pump-out/dump-out site in which the sewage source is located substantially directly above the cesspool. In sum, the exact structure of inlet 121 can take many forms based on the particulars of the sewage source and the intended method for use.

Inlet 121 is located at or near the top of body 120 in order to maximize the functional volume of body 120. Thus, for embodiments in which inlet 121 provides a sewage inlet flow path through the sidewall of body 120, inlet 121 is located in top 5%, 10%, 15%, 20% or 25% of the body 120 height. In some embodiments, inlet 121 may not pierce any aspect of body 120 which is advantageous because it creates fewer seals and joints which may be prone to leaking and failure over time. In these embodiments, inlet 121 may enter through cover 16 as described above or may comprise a pipe that runs below cover 16 or ground level and over the top edge of body 120.

Body

Body 120 defines the volume of cesspool liner 100. Body 120 may have any convenient shape, however, it is generally preferred if body 120 has an approximate cross-sectional shape that matches the cross-sectional shape of the cesspool or pit into which it is being placed. Similarly, it is generally preferred that body 120 has a height, when suspended, that is substantially equal to but slightly less than the cesspool or pit into which it is being placed. Closely matching the size and shape of body 120 to the cesspool pit into which it is being placed maximizes the functional volume available. Optionally, body 120 has a volume of about 500, 750, 1,000, 1,500, 2,000, 2,500, 3,000, 3,500, 4,000 gallons or more. In other embodiments, body has a volume of more than 250, 500, 750, 1,000, 1,500, 2,000, or 2,500 gallons.

Body 120 may be rigid, semi-rigid, or soft-sided depending upon the user's preference and the ultimate application of the cesspool liner 100. It may be desirable to use a rigid body 120 for de novo cesspool installation or for above-ground cesspool applications. It may be preferable that body 120 be soft-sided when cesspool liner 100 is designed for installation into an existing cesspool and/or for applications that require suspending cesspool liner 100 from above. In some embodiments, body 120 is constructed from PVC.

When sizing a soft-sided cesspool liner 100 relative to a cesspool, pit, or other structure into which liner 100 will be inserted, it is important that body 120 does not rest on the bottom of that structure. Sewage enters cesspool liner 100 through inlet 121 by flowing into primary settling space 122. Sludge settles to the bottom of body 120 and the clarified liquid flows up through secondary settling space 152. Thus, it is important that body 120 is not compressed such that the fluid flow gap 130 between the bottom of settling tower 150 and the bottom of body 120 is reduced or occluded.

Body 120 may have any convenient shape suitable for the application. Many existing cesspools are generally cylindrical (i.e., approximately circular in cross-section). Accordingly, cesspool liners that are generally cylindrical may be preferred. However, cuboidal or other shapes may be more appropriate for some applications. A spherocylindrical body 120 is illustrated herein but that shape is not intended to be limiting on the invention.

In preferred embodiments, body 120 is substantially fluid-impermeable.

Settling Tower

Settling tower 150 is a structure internal to body 120. It is illustrated as having the same shape as body 120 and is located approximately centrally within body 120. Each of these parameters is merely a design choice. Although it may be generally convenient for settling tower 150 to have approximately the same cross-sectional shape as body 120, it is not necessary. In some embodiments, settling tower 150 is cylindrical, frustoconical, or frustoconical with a stem (funnel-shaped), as illustrated. Furthermore, settling tower 150 may be centrally or peripherally located within body 120.

Settling tower 150 may be physically attached to body 120 in order to maintain the integrity and spatial/physical relationship among the elements of cesspool liner 100. Alternatively, settling tower 150 may be provided as a separate/detached element. For example, when installing cesspool liner 100 in existing cesspools wherein liner 100 will be suspended from above (e.g., suspended from cover 16), it may be convenient to first install body 120 and then to install settling tower 150 as a separate element. This configuration advantageously allows the installer to vary the height of fluid flow gap 130. Even if settling tower 150 is attached to body 120 it may be desirable for settling tower 150 to be suspended independently, particularly when soft/flexible materials are used.

Settling tower 150 may have any convenient volume. In some embodiments, settling tower 150 is occupies about 20%, 25%, 30%, 35%, 40%, 45%, 50%, 55%, 60%, or more of the volume of body 120. In other embodiments, settling tower 150 is less than about 50%, 40%, 30%, or 25% of settling tower 150.

Settling tower 150 may be constructed of any suitable material. It is generally convenient that settling tower 150 is constructed from the same or a similar material as body 120, but it is not necessary. It may be fluid-permeable or impermeable, but impermeable is preferred.

Optionally, settling tower 150 may have flow barrier 155. As illustrated in FIGS. 1 and 3, flow barrier 155 generally has two components: flow dam 155a and flow wall 155b. Flow dam 155a extends from the bottom of settling tower 150 to the bottom and the side of body 120 approximately adjacent to inlet 121. Flow dam 155a may extend in the vertical direction either a partial height (e.g., at least about 10%, 20%, 25%, 50%, 75%, 80%, or 90%) or the full height (100%) from the bottom of body 120 to the bottom of inlet 121. Flow dam 155a is configured to create a barrier or blind end in order to establish a fluid flow path away from flow dam 155a. Flow wall 155b attaches to flow dam 155a, extends from the bottom of settling tower 150 to the bottom of body 120, extends partially around fluid flow gap 130 in the direction of the fluid flow path, and forms an open portion 130a of fluid flow gap 130 at the end of the fluid flow path. In some embodiments, flow dam 155 extends around about 25%, 30%, 40%, 50%, 60%, 70%, 80%, 90%, or more of the fluid flow gap 130 provided that fluid flow gap 130 comprises an open portion 130a into which liquid can flow into secondary settling space 152.

In use, sewage enters primary settling space 122 from inlet 121. The heavier and denser solids settle quickly and accumulate below inlet 121 and against flow dam 155a. The liquid portion tends to follow the fluid flow path created by flow barrier 155 providing more time for the lighter and less dense solids to settle. Eventually, the liquid portion reaches the open portion 130a of fluid flow gap 130 and enters the secondary settling space 152. As described elsewhere, secondary settling space 152 provides additional height and time, and reduced turbulence, such that relatively solids-free liquid escapes outlet 151.

Overall, flow barrier 155 is configured to prevent sludge falling from inlet 121 from immediately fouling fluid flow gap 130. In essence, flow barrier 155 creates a sludge reservoir in the area below inlet 121 and establishes a fluid flow path around the perimeter of primary settling space 122 which allows more time for the solids to settle before the liquid portion enters the settling tower. It can be appreciated that without flow dam 155, raw sewage falling to the bottom of body 120 from inlet 121 would disturb settled sludge and tend to cause small particulates to be carried upward into secondary settling space 152, and generally cause sludge to plug fluid flow gap 130. In this configuration, the sludge capacity of cesspool liner 100 is dependent upon the height of fluid flow gap 130. However, flow dam 155 provides a reservoir area in which sludge can accumulate to a height greater than fluid flow gap 130 without blocking flow. Overall, flow dam 155 increasing the functional sludge-holding capacity of cesspool liner 100 and the time between required pump-out services.

Fluid Flow Gap

The fluid flow gap 130 is the fluid flow space between the bottom edge of settling tower 150 and the bottom inner surface of body 120. It is through this gap that fluids will flow from the primary settling space 122 into the secondary settling space 152. Sludge and other solid matter will settle on the bottom inner surface of body 120 and may tend to accumulate and block fluid flow gap 130. Thus, fluid flow gap 130 should be large enough to accommodate a certain amount of sludge without becoming blocked, and the sludge should be periodically removed or pumped out in order to maintain proper functioning of the cesspool liner 100. As discussed above, the use of flow dam 155 will delay or prevent blockage of fluid flow gap 130 with sludge.

Outlet

Outlet 151 is in fluid communication with secondary settling space 152 of settling tower 150 and is adapted to direct liquid from within that space out of cesspool liner 100. In one embodiment, outlet 151 discharges the liquid into pit space 12 in order that the liquid is then leaches through pit wall 10 and/or cesspool floor 14 and into the surrounding soil. In another embodiment, outlet 151 directs the liquid into another holding tank or sewage processing system such as a septic tank or a sewerage line.

Outlet 151 may comprise a pipe or flow channel such as a rigid pipe (e.g., metal and PVC) or collapsible tube. Outlet 151 is located at or near the top of settling tower 150 in order to maximize the functional volume of secondary settling space 152. In some embodiments, outlet 151 is located in top 5%, 10%, 15%, 20% or 25% of the settling tower 150 height.

Suspension Elements

As described for several of the foregoing embodiments, a soft-sided cesspool liner 100 may be suspended from above, particular when retrofitting existing cesspools. In one embodiment, cesspool liner 100 has a plurality of loops 102, hook, straps, hangers, or other suspension elements. Typically, these suspension elements are located on the top edge of body 120, settling tower 150, or both. The suspension elements may be reversibly or irreversibly fastened. The suspension elements may be fastened to cover 16 or to runners placed over the pit.

Bacterial Substrates

In some embodiments, cesspool liner 100 optionally contains one or more bacterial substrates 160. Bacterial substrates 160 may be present in the primary settling space 122, the secondary settling space 152, or both. Bacterial substrates may be fashioned from any material that is suitable to support bacterial growth and withstand prolonged exposure to sewage without experiencing structural failure. Suitable materials include, for example, synthetic (e.g., nylon) and natural fiber (e.g., hemp, cotton, etc.) rope, or any material that is suitable to support bacterial growth. Optionally, one or more of the bacterial substrates 160 are replaceable including, for example, through an access port in cover 16.

Bacterial substrates 160 may be attached during cesspool liner 100 manufacturing and/or may be affixed after manufacture and/or even after installation. Bacterial substrates 160 may be "pre-loaded" with bacteria in a live, dormant, or dried state, or bacteria may be introduced after bacterial substrates 160 are installed in cesspool liner 100, and/or after cesspool liner 100 is installed at its operational location. Bacterial substrates 160 may contain one, two, three, four, or more strains and/or species of bacteria. The bacteria may be aerobic, anaerobic, facultative, or a mixture thereof. Suitable bacteria for sewage treatment include, for example, *Bacillus* spp. And *Pseudomonas* spp., *Archromobacter* spp., *Zoogloea* spp., *Nitrosomonas* spp., and *Nitrobacter* spp. Bacterial substrates may contain one or more substances that promote bacterial growth including, for example, growth media (dehydrated), salts, a carbon source such as glucose, succinate, lactose, mannitol, or other sugars, free amino acids, di-peptides, tri-peptides, and peptones, a nitrogen source, and/or potassium phosphate (e.g., dipotassium hydrogen phosphate and potassium dihydrogen phosphate).

Aeration System

Optionally, cesspool liner 100 also as an aeration system. Aeration systems are particularly useful in combination with bacterial substrates 160 that contain aerobic bacteria. The aeration system contains an air pump or similar system to direct ambient air into the interior of cesspool liner 100. Typically, the aeration system also contains one, two, three, four, or more air diffusers 170, air vents, air jets, or similar devices distributed about the cesspool liner 100 and in communication with the air pump. Typically, air diffusers 170 will be located toward the bottom (e.g., bottom 50%) of cesspool liner 100 and will direct air into primary settling area 122 which optionally contains bacterial substrates 160. In one embodiment, air diffusers 170 are in communication with air pump via tubing affixed to the exterior surface of, or integrated within, body 120. Air pump may run continuously or intermittently and may be manually, automatically, and/or remotely-controlled.

Two-Chambered Body

In some configurations, body 120 and, in particular, primary settling space 122, may be divided into two separate chambers in fluid communication. FIG. 4A illustrates a cross-sectional top view of a two-chambered body configuration in which the primary settling space 122 is divided into a retention chamber 125 and a primary settling chamber 126. Retention chamber 125 is defined by lateral retention chamber walls 127a,b a portion of the side wall of settling tower 150, and a portion of body 120. Retention chamber 125 may occupy any convenient portion of the primary settling space 122. In some embodiments, retention chamber 125 comprises about 10%, 15%, 20%, 25%, 30%, 35%, 40%, 45%, 50%, or more of the primary settling space with the remainder defining the primary settling chamber 126 portion of the primary settling space 122. For a cesspool liner body 120 that is substantially circular, retention chamber 125 may be defined by angle α, wherein α is about 30°, 35°, 40°, 45°, 50°, 60°, 70°, 80°, 90°, 100°, 120°, 140°, 160°, 170°, 180°, or more.

Lateral retention chamber walls 127a,b form a substantially fluid impermeable seal with the side wall of settling tower 150 and body 120 in order to define retention chamber 125. As illustrated in FIG. 4B, one or both lateral retention chamber walls 127a,b further comprise fluid conduit 128 which provides a fluid communication path between retention chamber 125 and primary settling chamber 126. Conduit 128 may be as simple a hole in the lateral retention chamber wall 127 or may comprise additional elements including structural features to improve the integrity of conduit 128 including, for example, a pipe/tube and a ring to maintain conduit 128 patency. Optional elements also include filters, screens, and the like in order to limit the passage of solid matter and/or scum through conduit 128. Typically, conduit 128 is positioned in the top 50%, 60%, 70%, or 80% of the vertical height of body 120. In some embodiments and for some uses, it may not be advisable to position conduit 128 above about 80% of body 120 height in order to minimize the flow of scum into primary settling chamber 126. It is understood that the exact vertical positioning, size, and shape of conduit 128 will depend upon the final configuration of liner 100, including the relative volume of retention 125 to body 120 volume and/or primary settling space 122 volume, and the expected type of input material.

Inlet 121 (not shown) provides raw sewage and other material inflow into retention chamber 125 wherein primary solids settling and separation of the solid fraction, liquid fraction, and scum layer occurs. The majority of the solid material therefore settles and is retained in retention chamber 125. As retention chamber 125 fills, the liquid fraction escapes retention chamber 125 through conduit 128 and into primary settling chamber 126. Primary settling chamber 126 functions in a similar manner as described for the primary settling space 122 in the foregoing one-chamber systems. In particular, the primary settling chamber 126 provides a longer residence time for the liquids fraction to allow for further solids settling and biodegradation/treatment before the clarified liquid enters the settling tower 150 through fluid flow gap 130 and eventually exits through outlet 151.

It is understood that fine solid material may be suspended in the liquid fraction and enter primary settling chamber 126. However, the advantage of the two-chambered body is at least two-fold. First, the majority of the solid matter is retained in retention chamber 125 which facilitates pump-outs and reduces the likelihood and frequency that fluid flow gap 130 becomes clogged. Second, processing and treatment of the fluid fraction may be improved when it is physically separated from the solids fraction leading to a cleaner effluent that is ultimately discharged into the soil surrounding the cesspool.

The two-chamber body configuration is compatible with the optional features described above. For example, the bacterial substrates 160 may be installed in retention chamber 125, primary settling chamber 126, or both. Likewise, an aeration system may be connected to retention chamber 125, primary settling chamber 126, or both.

Sludge-Lifting System

In some embodiments of the two-chambered body configuration, the cesspool liner 100 further comprises a sludge-lifting system that is configured to draw settled solid material/sludge from the bottom of the primary settling chamber 126 and deposit it back into retention chamber 125. The sludge-lifting system promotes biodegradation, improves cesspool performance, and reduces the frequency of primary settling chamber 126 pump out by reducing the amount of solid material that may block fluid flow gap 130.

In some embodiments, the sludge-lifting system is a conventional airlift pump or a geyser pump system, each as described in US 2007/0166171 which is hereby incorporated by reference in its entirety. Briefly, an airlift pump delivers an airflow into the bottom of a riser, the open end of which is submerged below the top of the liquid level in a container. Liquid and solid material from the bottom of the container are carried upwards through the riser and expelled from an outlet at a height above the liquid level. A geyser pump system utilizes two input lines and a specially-adapted riser in order to create additional suction for drawing the solid matter upwards through the riser.

The inlet of the riser of the sludge-lifting system may be positioned within the primary settling chamber 126 and/or the fluid flow gap 130. Importantly, the riser inlet should be positioned to draw sludge out of and away from the fluid flow gap. The riser may be disposed within the primary settling chamber 126 or the secondary settling space 152 provided that the riser outlet is positioned to deposit the effluent into retention chamber 125. Airflow for the sludge-lifting system may come from a dedicated air pump or may be supplied by the air pump used in an aeration system, as described above. Optionally, the aeration system comprises two separate air delivery systems for aerating the settling space(s) and the sludge-lifting system, respectively. Alternatively, the sludge-lifting system is configured to provide aeration through a common air line.

The invention has been described broadly and generically herein. Each of the narrower species and subgeneric groupings falling within the generic disclosure also form part of the methods. This includes the generic description of the methods with a proviso or negative limitation removing any subject matter from the genus, regardless of whether or not the excised material is specifically recited herein.

Other embodiments are within the following claims. In addition, where features or aspects of the methods are described in terms of Markush groups, those skilled in the art will recognize that the invention is also thereby described in terms of any individual member or subgroup of members of the Markush group.

Which is claimed is:

1. A system for retrofitting a cesspool, the system comprising:
    an apparatus comprising:
    (a) an outer fluid retention bag having a top and a bottom, comprising an outer shell of fluid-impermeable material and having a working volume of at least 250 gallons, and wherein the apparatus is configured to be suspended in a below-ground pit such that the bottom of the outer fluid retention bag does not contact a bottom of the below-ground pit;
    (b) an inner chamber with an open bottom disposed within the outer fluid retention bag (i) defining a primary settling space between the outer fluid retention bag and the inner chamber, (ii) defining a secondary settling space within the inner chamber, and (iii) defining a fluid flow path from the primary settling space into the secondary settling space through the open bottom;
    (c) an inlet defining a flow path adapted to deliver fluid from outside of the outer fluid retention bag into the primary settling space;
    (d) an outlet defining a flow path adapted to deliver fluid from within the secondary settling space to outside of the outer fluid retention bag; and
    (e) one or more suspension elements attached to the top of the outer fluid retention bag and adapted to suspend the outer fluid retention bag from above, wherein the suspension elements comprise one or more of: a plurality of loops, a hook, one or more straps, one or more hangers, and/or a frame.

2. The system of claim 1, wherein the outer fluid retention bag is substantially cylindrical or spherocylindrical.

3. The system of claim 1, wherein the outer fluid retention bag is open at the top.

4. The system of claim 1, wherein the outer fluid retention bag comprises PVC.

5. The system of claim 1, wherein the inner chamber comprises a frustoconical shape.

6. The system of claim 1, wherein the inlet is attached to a sewage source.

7. The system of claim 1, wherein the suspension elements comprise the plurality of loops.

8. The system of claim 1, further comprising a flow barrier extending from a side wall of the inner chamber to a side wall of the outer fluid retention bag and establishing a fluid flow path around the primary settling space.

9. The system of claim 1, further comprising one or more bacterial substrates within the primary settling space.

10. The system of claim 1, further comprising an air pump and one or more diffusors adapted to deliver ambient air into the primary settling space, the secondary settling space, or both.

11. The system of claim 1, further comprising:
    a pit cover.

12. The system of claim 11, wherein the apparatus is suspended from the pit cover.

* * * * *